US009864149B1

(12) United States Patent
Fredell et al.

(10) Patent No.: US 9,864,149 B1
(45) Date of Patent: Jan. 9, 2018

(54) CLEANING NOZZLE, APPARATUS, NOZZLE ASSEMBLY, AND METHODS FOR OPTICAL FIBER CONNECTORS

(71) Applicant: Corning Optical Communications LLC, Hickory, NC (US)

(72) Inventors: James Edmund Fredell, Corning, NY (US); Keith Mitchell Hill, Horseheads, NY (US); Elias Panides, Horseheads, NY (US); Simeon Panides, Horseheads, NY (US); Jingru Zhang, Enfield, CT (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/293,930

(22) Filed: Oct. 14, 2016

(51) Int. Cl.
G02B 6/36 (2006.01)
G02B 6/38 (2006.01)

(52) U.S. Cl.
CPC ......... *G02B 6/3866* (2013.01); *G02B 6/3845* (2013.01)

(58) Field of Classification Search
CPC .. G02B 6/3886; G02B 6/3845; B08B 2240/02
See application file for complete search history.

(56) References Cited

U.S. PATENT DOCUMENTS

| 4,733,428 | A | * | 3/1988 | Malinge | B08B 3/02 15/302 |
| 6,810,552 | B2 | * | 11/2004 | Miyake | B08B 1/00 15/104.001 |
| 6,821,025 | B2 | * | 11/2004 | Gerhard | B08B 3/02 385/85 |
| 6,853,794 | B2 | * | 2/2005 | Lu | B08B 3/12 134/184 |
| 7,147,386 | B2 | * | 12/2006 | Zhang | B08B 3/02 385/134 |
| 7,147,490 | B2 | | 12/2006 | Gerhard | |
| 7,232,262 | B2 | * | 6/2007 | Lytle | B08B 3/02 385/85 |
| 7,566,176 | B2 | * | 7/2009 | Lytle | B08B 3/02 385/134 |

(Continued)

FOREIGN PATENT DOCUMENTS

| CA | 2489838 C | 2/2013 |
| CN | 1668952 A | 9/2005 |

(Continued)

*Primary Examiner* — Rhonda Peace
(74) *Attorney, Agent, or Firm* — Adam R. Weeks

(57) ABSTRACT

The cleaning nozzle is used for cleaning an optical fiber connector using a cleaning fluid. The optical fiber connector includes a connector housing. A ferrule is supported within the interior of the connector housing. The nozzle has inner and outer housing members that respectively define an inner channel and an outer channel. The inner channel is sized to accommodate a front-end section of the ferrule. The inner and outer channels are in fluid communication through the interior of the connector housing when the front-end section of the ferrule resides within the inner channel. The nozzle assembly includes the nozzle and the optical fiber connector. Methods of cleaning the interior of the optical fiber connector as well as the ferrule end face, the optical fiber end face and the ferrule outer surface are also disclosed.

23 Claims, 13 Drawing Sheets

(56) References Cited

U.S. PATENT DOCUMENTS

| | | | |
|---|---|---|---|
| 2002/0131748 A1* | 9/2002 | Sato | G02B 6/25 385/134 |
| 2004/0005134 A1* | 1/2004 | Sun | B08B 3/12 385/134 |
| 2004/0013370 A1* | 1/2004 | Gerhard | B08B 3/02 385/85 |
| 2004/0033050 A1 | 2/2004 | Lytle et al. | |
| 2005/0105859 A1* | 5/2005 | Gerhard | B08B 3/02 385/85 |
| 2007/0034227 A1 | 2/2007 | Hesch, Jr. et al. | |
| 2007/0196056 A1* | 8/2007 | Gerhard | B08B 3/02 385/85 |
| 2007/0243008 A1 | 10/2007 | Vogt | |

FOREIGN PATENT DOCUMENTS

| | | |
|---|---|---|
| CN | 100376910 C | 3/2008 |
| WO | 2004010189 A1 | 1/2004 |

* cited by examiner

CLEANING NOZZLE, APPARATUS, NOZZLE ASSEMBLY, AND METHODS FOR OPTICAL FIBER CONNECTORS

FIELD

The present disclosure relates to optical fiber connectors and in particular to a cleaning nozzle, a nozzle assembly, a cleaning apparatus and cleaning methods for optical fiber connectors.

BACKGROUND

Optical fiber connectors are used to optically couple at least two optical fibers. To this end, an optical fiber connector supports an end portion of at least one optical fiber. The end portion of each optical fiber has a polished end face. When two optical fiber connectors are operably engaged, the end faces of the corresponding optical fibers are placed in close proximity and in a confronting orientation to facilitate the communication of light from one fiber to the other through the optical fiber end faces.

The optical fiber end faces need to be kept clean to ensure optimum optical transmission and to avoid damage to the optical fibers when the optical fibers are placed into close proximity using optical fiber connectors. Prior art optical fiber cleaning techniques focus on cleaning the optical fiber end face only. However, contaminants from other parts of the optical fiber connector often find their way to the optical fiber end face after the end-face cleaning process.

SUMMARY

An embodiment of the disclosure is a nozzle assembly. The nozzle assembly includes an optical fiber connector. The optical fiber connector includes a connector housing having an interior surface defining an interior of the connector housing. The optical fiber connector also includes a ferrule supported within the interior of the connector housing and having an outer surface and a front-end section. The nozzle assembly also includes a nozzle that is at least partially inserted into the optical fiber connector. The nozzle has inner and outer housing member. The inner housing member has an inner channel and is at least partially disposed within the outer housing member to define an outer channel between the inner and outer housing members. The inner housing member also has an outer surface. The front-end section of the ferrule resides within the inner channel and the front end of the inner housing member resides within the interior of the connector housing to define a cleaning conduit. The cleaning conduit includes: i) a first conduit section between the outer surface of the ferrule and the inner surface of the inner housing member; ii) a second conduit section that includes at least a portion of the outer surface of the inner housing member; and iii) a third conduit section that fluidly connects the first and second conduit sections.

Another embodiment of the disclosure is a cleaning apparatus that includes the nozzle assembly as described above and that also includes a cleaning fluid delivery system in fluid communication with the nozzle. The cleaning apparatus also includes an attachment fixture located at a back end of the nozzle, wherein the attachment fixture attaches the nozzle to the cleaning fluid delivery system.

Another embodiment of the disclosure is a nozzle assembly. The nozzle assembly has an optical fiber connector. The optical fiber connector includes a connector housing with an interior surface defining an interior of the connector housing. The optical fiber connector also has a ferrule supported within the interior of the connector housing and having an outer surface and a front-end section. The nozzle assembly also has a nozzle operably engaged with the optical fiber connector. The nozzle has inner and outer housing members. The outer housing member has a central axis and a front end that resides adjacent the front end of the connector housing. The inner housing member is disposed along the central axis to define inner and outer channels. The front-end section of the ferrule resides within the inner channel to define within the inner and outer channels respective inner and outer conduits that are in fluid communication over a flow path that includes at least a portion of the interior surface of the connector housing.

Another embodiment of the disclosure is a nozzle for cleaning an optical fiber connector with a cleaning fluid. The optical fiber connector includes a connector housing with an interior defined by an interior surface and a ferrule supported within the interior and having an outer surface and a front-end section. The nozzle includes: inner and outer housing members that respectively define an inner channel and an outer channel. The inner channel is sized to accommodate the front-end section of the ferrule. The inner and outer channels are configured to be in fluid communication through at least a portion of the interior of the connector housing when the front-end section of the ferrule resides within the inner channel.

Another embodiment of the disclosure is a method of cleaning an optical fiber connector having a connector housing and a ferrule supported within the connector housing. The connector housing includes an interior surface that defines an interior. The method includes: disposing a front-end section of the ferrule in an inner channel of a nozzle to define a flow path for a cleaning fluid, wherein the front-end section of the ferrule includes a ferrule front end and a ferrule outer surface, and further wherein the flow path includes the ferrule front end, the ferrule outer surface, and at least a portion of the interior surface of the connector housing; and flowing the cleaning fluid over the flow path.

Another embodiment of the disclosure is a method of removing contaminants from an optical fiber connector having a connector housing and a ferrule having an end face and an outer surface and supported within the connector housing. The connector housing includes an interior surface that defines an interior. The method includes: a) inserting a front-end section of a nozzle into the interior of the optical fiber connector, the nozzle having inner and outer housing members that define inner and outer channels; and b) flowing a cleaning fluid through the inner channel, through at least a portion of the connector housing interior and through the outer channel to remove contaminants from the ferrule end face and from at least a portion of the ferrule outer surface and from at least a portion of the connector housing interior.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The term "tubular" is used herein in a general sense to describe the cross-sectional shape of structures, gaps, openings, conduits, etc. that have a generally hollow shape defined by inner and outer surfaces that may or may not have similar profiles. The profiles may be any shape, including by way of example and not limitation, circular, elliptical, rectangular, triangular, etc. Additionally, the cross-sectional shape may or may not have a uniform thickness between the inner and outer surfaces.

The term "annular" is used herein in a general sense to describe the cross-sectional shape of structures, gaps, openings, conduits, etc. that have a general ring shape defined by inner and outer surfaces having profiles that may or may not be concentric circles. Thus, as used herein, "annular" is a sub-set of "tubular."

Cleaning Apparatus

Figure 1:
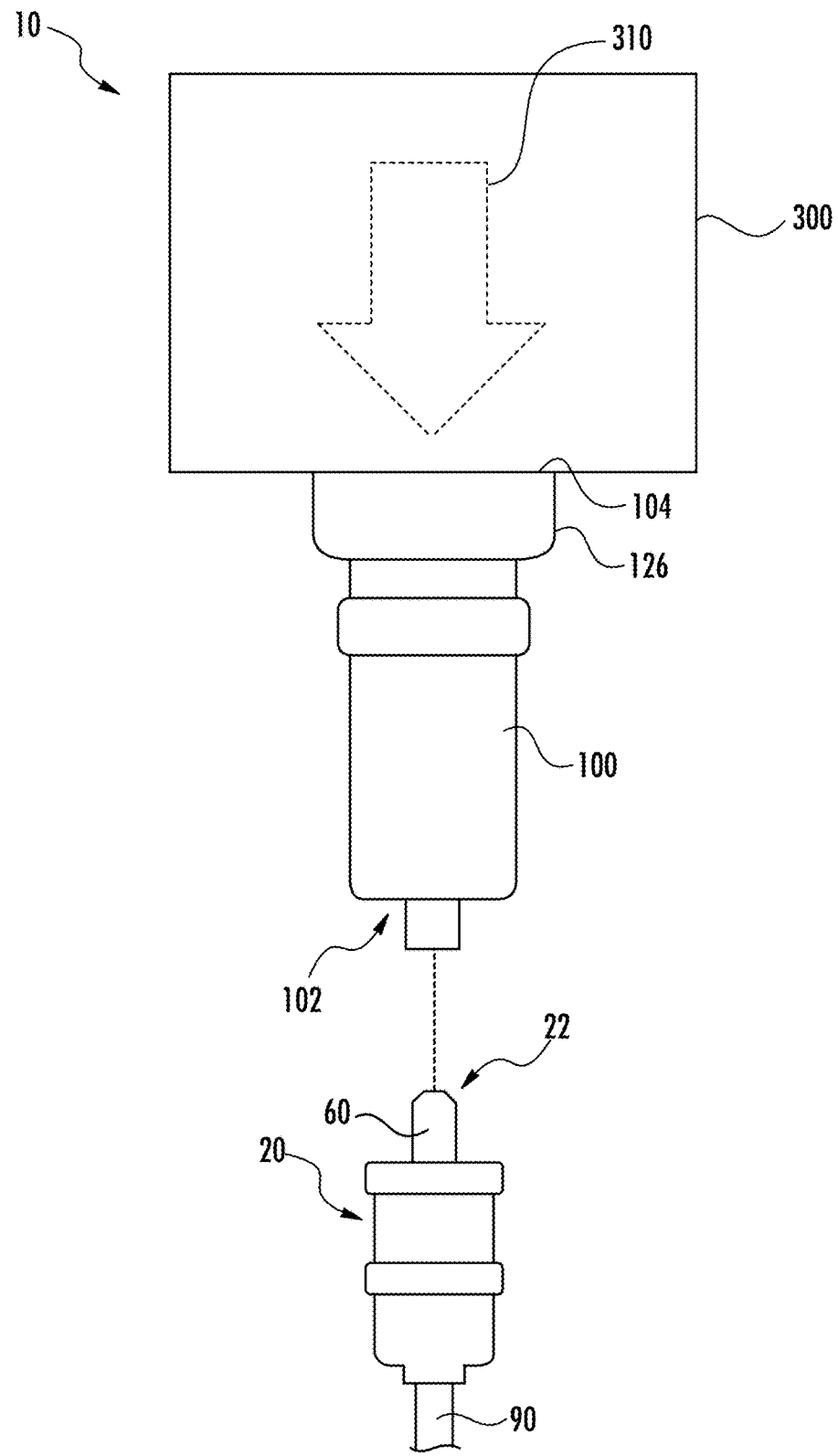
FIG. 1 is a schematic diagram of an example cleaning apparatus used for cleaning an optical fiber connector using the methods described herein.

FIG. 1 is a schematic diagram of an example cleaning apparatus 10 used for cleaning an optical fiber connector ("connector") 20 using the methods described herein. The connector 20 has a front end 22 and operably supports an optical fiber 90. The cleaning apparatus 10 includes a nozzle 100 having a front end 102 and a back end 104 and a central axis AN. The nozzle 100 is operably coupled at back end 104 to a pressurized cleaning fluid delivery system ("delivery system") 300 such that the nozzle is in fluid communication with the delivery system. The delivery system 300 is configured to a provide a cleaning fluid 310 to the nozzle 100. In examples, cleaning fluid 310 consists of a gas or consists of a solvent or comprises a combination of a gas and a solvent. Various configurations for delivery system 300 are known in the art.

The front end 102 of nozzle 100 is configured to engage front end 22 of connector 20. Cleaning apparatus 10 is used to carry out methods of cleaning the connector, as explained in greater below.

Example configurations of connector 20 and nozzle 100 are now described in greater detail.

Connector

Figure 2:
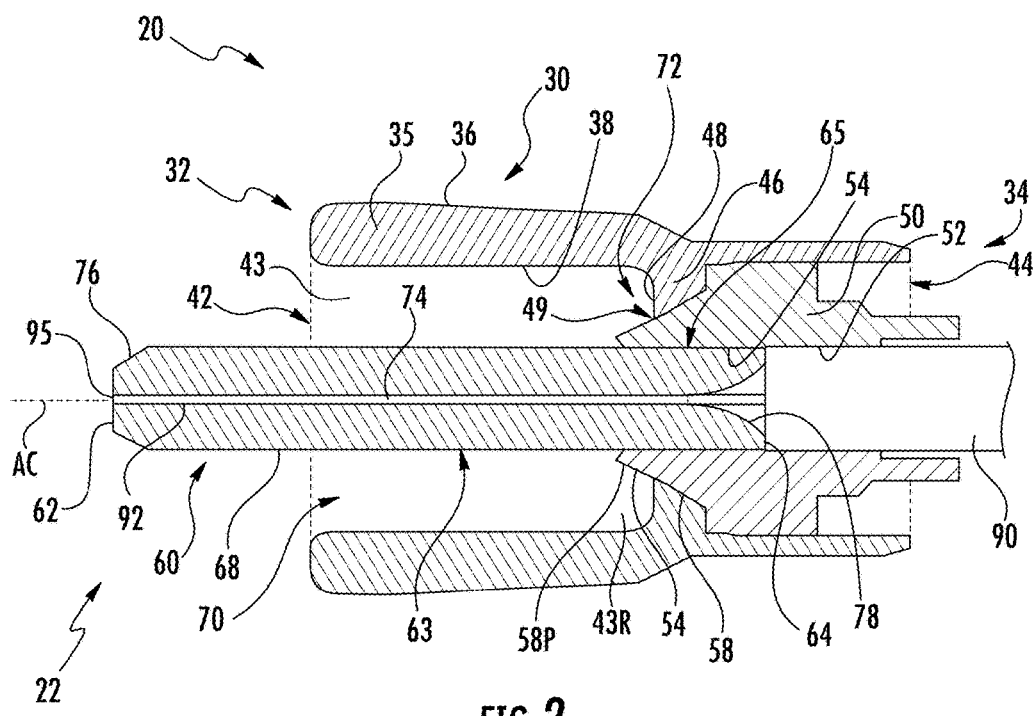
FIG. 2 is a cross-sectional view of an example optical fiber connector.

FIG. 2 is a cross-sectional view of an example connector 20. In an example, connector 20 is an LC connector, SC connector, MPO connector, or other type of connector. Connector 20 can have a single-fiber configuration or a multi-fiber configuration. The connector 20 includes a central axis AC and a housing 30 centered on the central connector axis AC. The housing has a front end 32, a back end 34, and at least one sidewall 35. The at least one sidewall 35 defines an outer surface 36 and an interior surface 38 (also referred to as "housing interior surface 38" in this disclosure). The housing interior surface 38 includes other internal portions of connector 20 besides sidewall 35, as described in greater detail below.

In an example, housing 30 can have rectangular or polygonal cross-sectional shape, while in another example the housing can have a circular cross-sectional shape. In the case where housing 30 has a rectangular cross-sectional shape, there are four sidewalls 35. In the case where housing 30 has a circular cross-sectional shape, there is one continuous sidewall 35. In the discussion below, it is assumed by way of example that housing 30 has a rectangular cross-sectional shape with four sidewalls 35.

With continuing reference to FIG. 2, housing 30 includes a front-end recess 42 at front end 32 and a back-end recess 44 at back end 34. The front-end recess 42 defines an interior ("housing interior") 43. The front-end recess 42 and back-end recess 44 are defined in part by an interior wall 46 located between front end 32 and back end 34. The interior wall 46 has an interior surface 48 facing front end 32. The interior wall 46 also has a central opening 49 centered on central axis AC. The interior surface 48 constitutes a portion of housing interior surface 38. The housing interior 43 includes a rear portion 43R immediately adjacent interior wall 46.

The housing 30 supports a ferrule holder 50 in back-end recess 44. The ferrule holder 50 includes a central channel 52 and a front-end section 54 that has an outer surface 58. The front-end section 54 extends through central opening 49 a short distance into front-end recess 42 so that a portion 58P of outer surface 58 serves as an interior wall within housing interior 43. The portion 58P of outer surface 58 can also be considered to define a portion of housing interior surface 38. In alternative embodiments, front-end section 54 of ferrule holder 50 may not extend through central opening 49.

The ferrule holder 50 is configured to hold a ferrule 60 along the central axis AC. The ferrule 60 includes a front end 62 that is part of a front-end section 63 and a back end 64 that is part of a back-end section 65 of ferrule 60. The ferrule holder 50 is configured to hold the back-end section 65 within central channel 52 so that the front-end section 63 of the ferrule 60 extends through housing interior 43 and beyond the front end 32 of housing 30.

The front-end section 63 of ferrule 60 includes an outer surface 68. The outer surface 68 of ferrule 60, the interior surfaces 38 of sidewalls 35, the interior surface 48 of interior wall 46, and the portion 58P of outer surface 58 of ferrule holder 50 define a tubular gap 70. The tubular gap 70 has an inner cross-sectional shape defined by the cross-sectional shape of ferrule 60 and an outer cross-sectional shaped defined by the cross-sectional shape of housing 30. In one example, ferrule 60 has a circular cross-sectional shape while housing 30 has a rectangular (e.g., square) cross-sectional shape. The portion of tubular gap 70 at rear section 43R of housing interior 43 forms a well 72.

The ferrule 60 also includes an axial bore 74 (also referred to as "ferrule bore 74") that runs longitudinally through the ferrule from front end 62 to back end 64. In an example, front end 62 includes a chamfered outer edge 76, and back end 64 includes a flare 78 centered on axial bore 74 to facilitate the insertion of optical fiber 90 into connector 20. The optical fiber 90 includes a front-end section 92 that is supported within ferrule bore 74. The front-end section 92 of optical fiber 90 includes an end face 95 that resides substantially at the front end 62 of ferrule 60. In an example, front end 62 of ferrule 60 defines a ferrule end face.

The connector 20 can include other components that are not shown for ease of illustration.

Nozzle

Figure 3A:
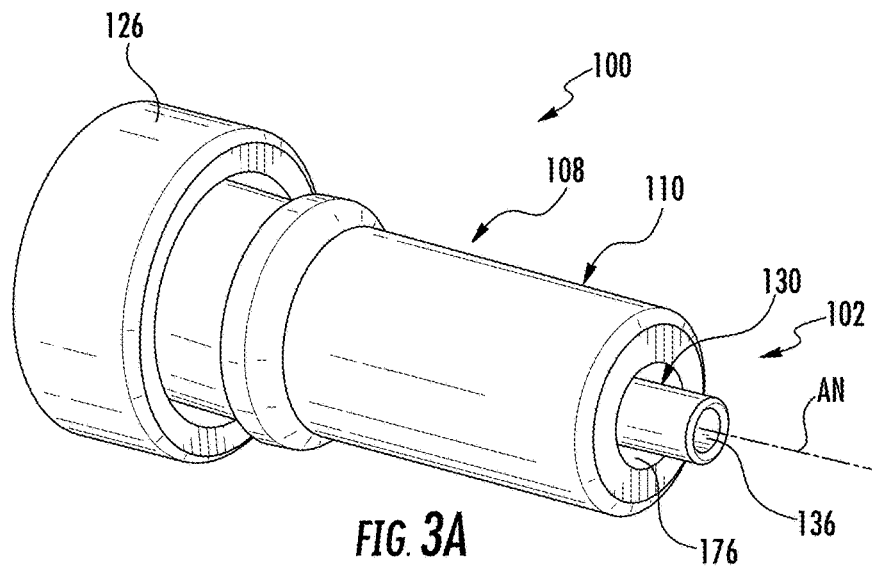
FIGS. 3A and 3B are front-end and back end perspective views, respectively, of an example nozzle as disclosed herein.
Figure 3B:
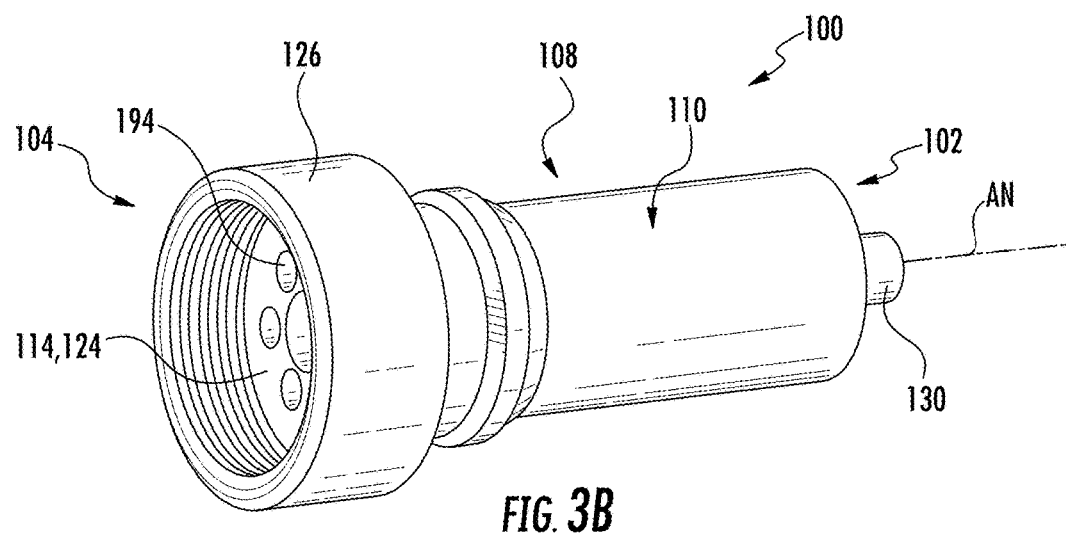
Figure 4:
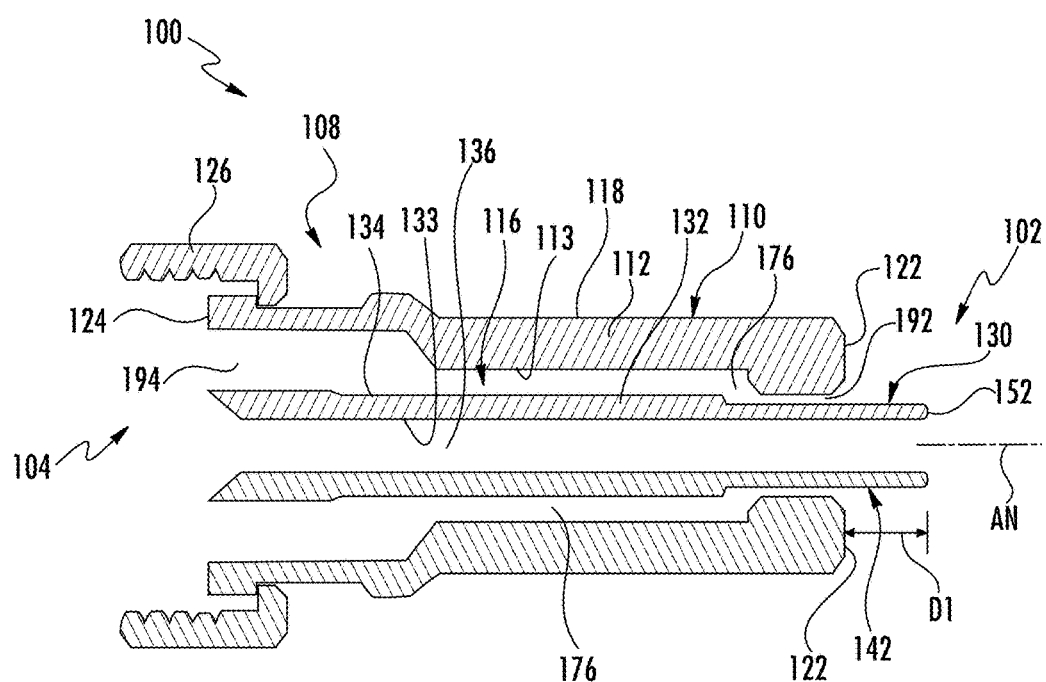
FIG. 4 is a cross-sectional view of the example nozzle of FIGS. 3A and 3B.

FIGS. 3A and 3B are front-end and back-end perspective views, respectively, of an example nozzle 100. FIG. 4 is a cross-sectional view of the nozzle 100 of FIGS. 3A and 3B. The nozzle 100 includes the aforementioned front and back ends 102 and 104 and central axis AN. The nozzle 100 also includes a housing 108 comprising an outer housing member 110 and an inner housing member 130. In an example, outer housing member 110 is defined by a wall 112 that has an inner surface 113, an outer surface 118, a front end 122, and a back end 124. The inner surface 113 defines an interior 116. The outer surface 118 constitutes an outer surface of outer housing member 110 as well as an outer surface for housing 108. The front end 122 defines a front end of outer housing member 110. The back end 124 is located at the back end 104 of nozzle 100. In an example, wall 112 of outer housing member 110 has a generally tubular shape.

The back end 104 of nozzle 100 can include a back wall 114 (see FIG. 3B). The nozzle 100 can also include an attachment fixture 126 disposed adjacent or at back end 104 for operably coupling outer housing member 110 to delivery system 300 (see FIG. 1). In an example, attachment fixture 126 comprises a threaded flange. Other types of attachment fixtures can be used, such as snap-and-lock fixtures.

With reference to FIG. 4, outer housing member 110 supports inner housing member 130 along central axis AN and within interior 116. In an example, inner housing member 130 has a tubular shaped as defined by a tubular wall 132 centered on nozzle central axis AN. The tubular wall 132 has an inner surface 133 and an outer surface 134. The inner surface 133 defines an inner channel 136 centered on nozzle central axis AN and that is open at the front end 102 of nozzle 100 and at back wall 114. The inner housing member 130 has a front-end section 142 that includes a front end 152.

In the embodiment shown, tubular wall 112 of outer housing member 110 surrounds all but front-end section 142 of inner housing member 130. The inner surface 113 of tubular wall 112 and outer surface 134 of tubular wall 132 define an annular outer channel 176 that surrounds a portion of the inner channel 136. Thus, this is one example of how outer housing member 110 and inner housing member 130 can define inner and outer channels 136 and 176. The front-end section 142 of inner housing member 130 extends beyond front end 122 of outer housing member 110 by a distance D1.

The outer channel 176 has a generally annular opening 192 at front end 122. In an example, the outer channel is open at back wall 114 through one or more openings 194 (see FIG. 3B).

Nozzle Assembly

Figure 5:
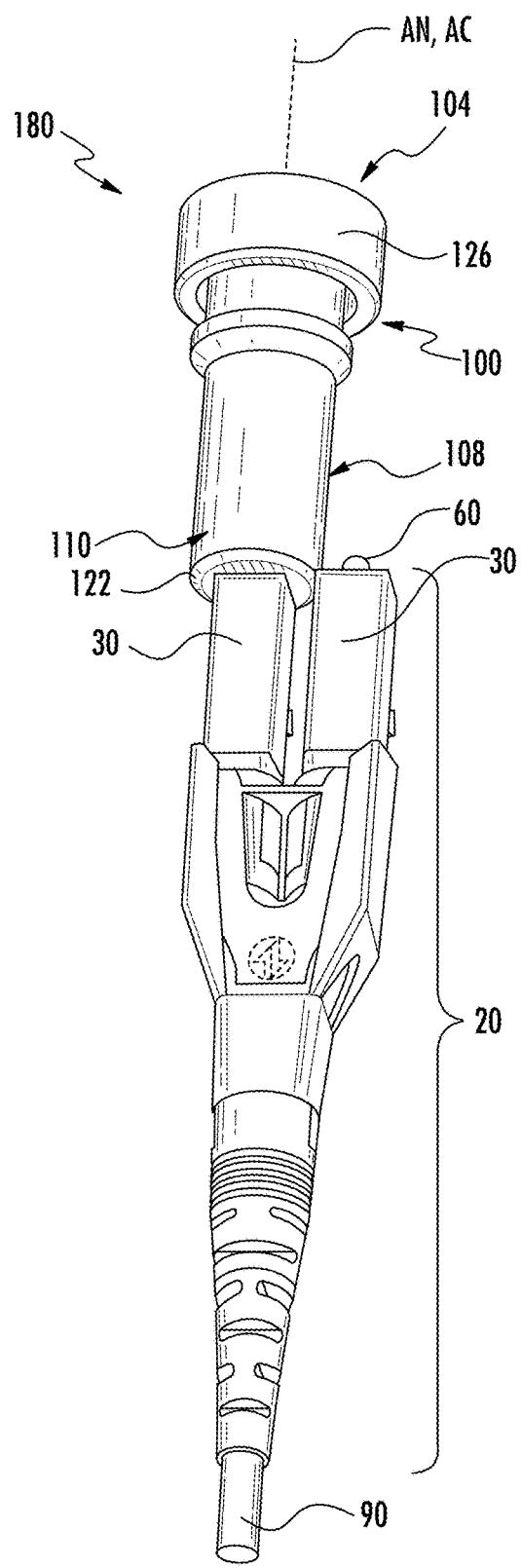
FIG. 5 is a perspective view of an example nozzle assembly formed by the nozzle of FIGS. 3A and 3B being operably coupled to an optical fiber connector.
Figure 6A:
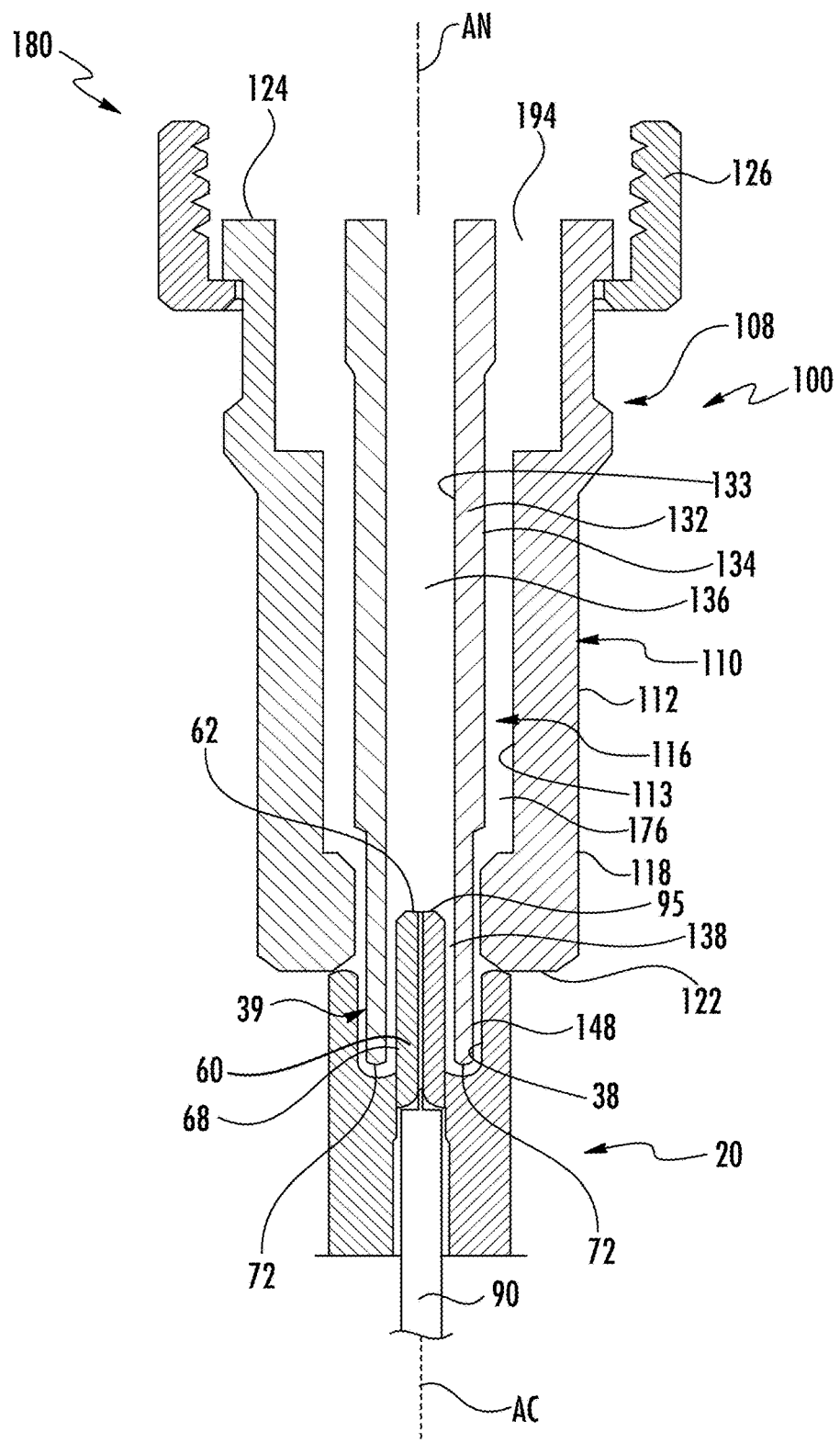
FIGS. 6A through 6D are cross-sectional views of the example nozzle assembly of FIG. 5.
Figure 6B:
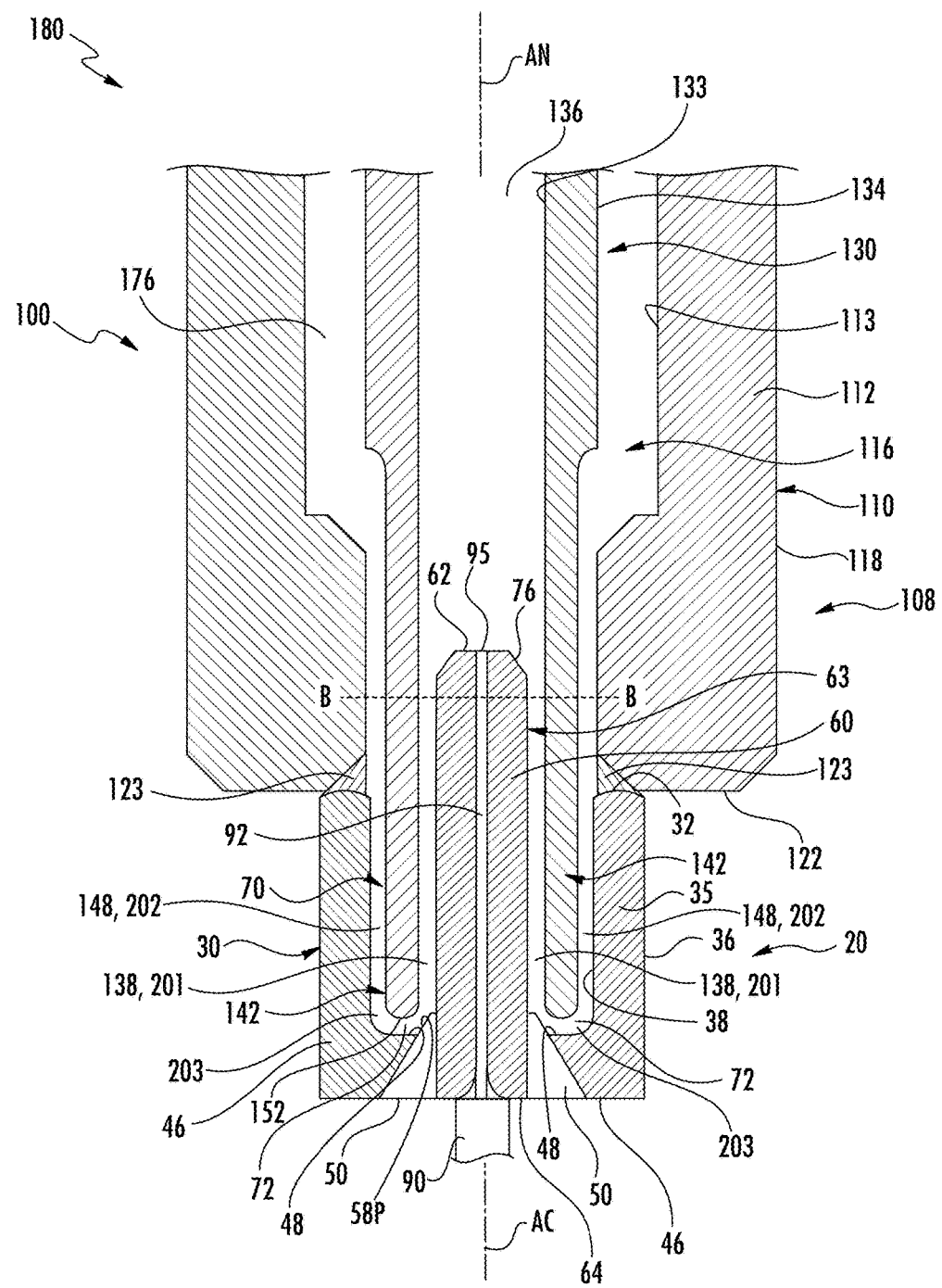
Figure 6C:
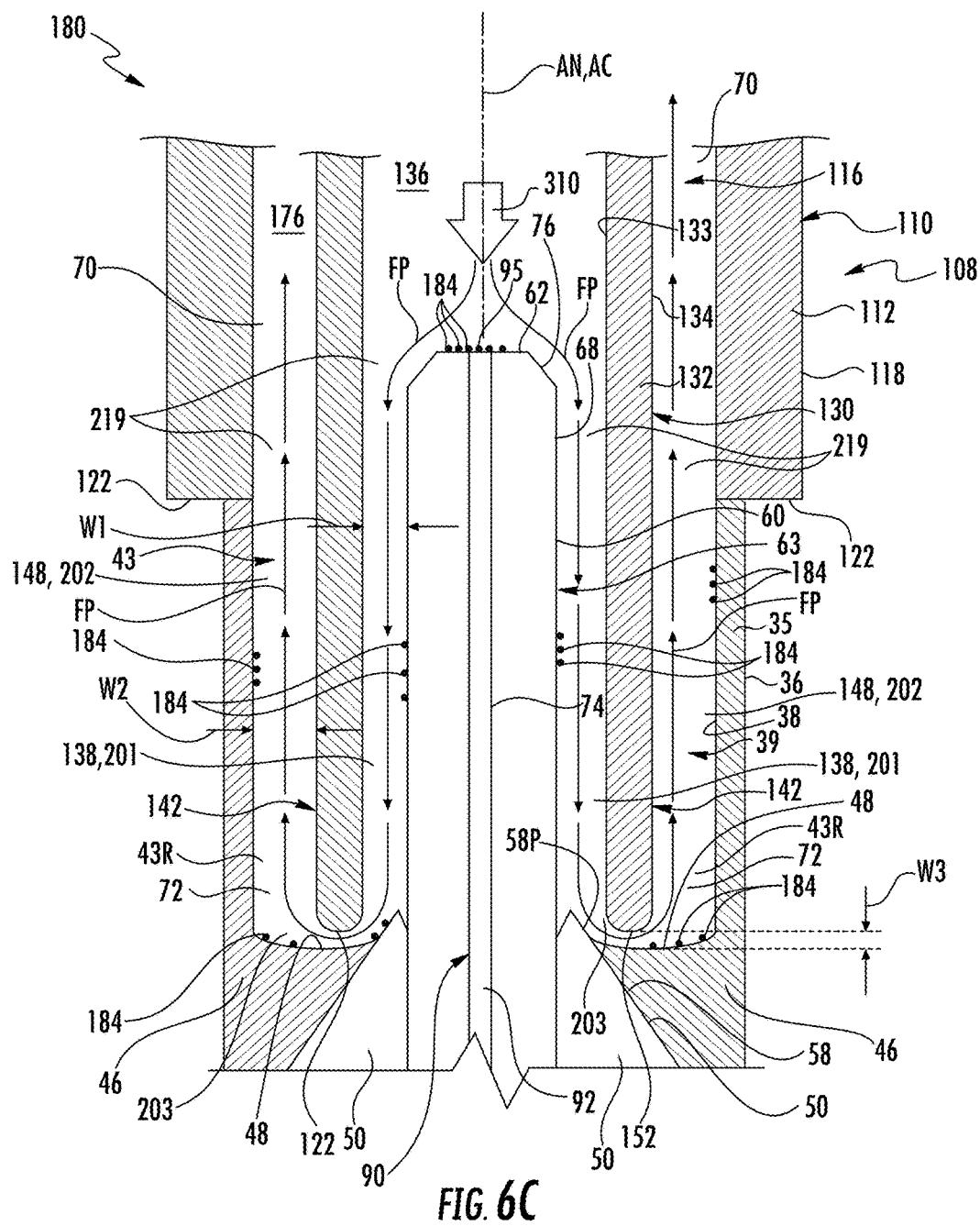
Figure 6D:
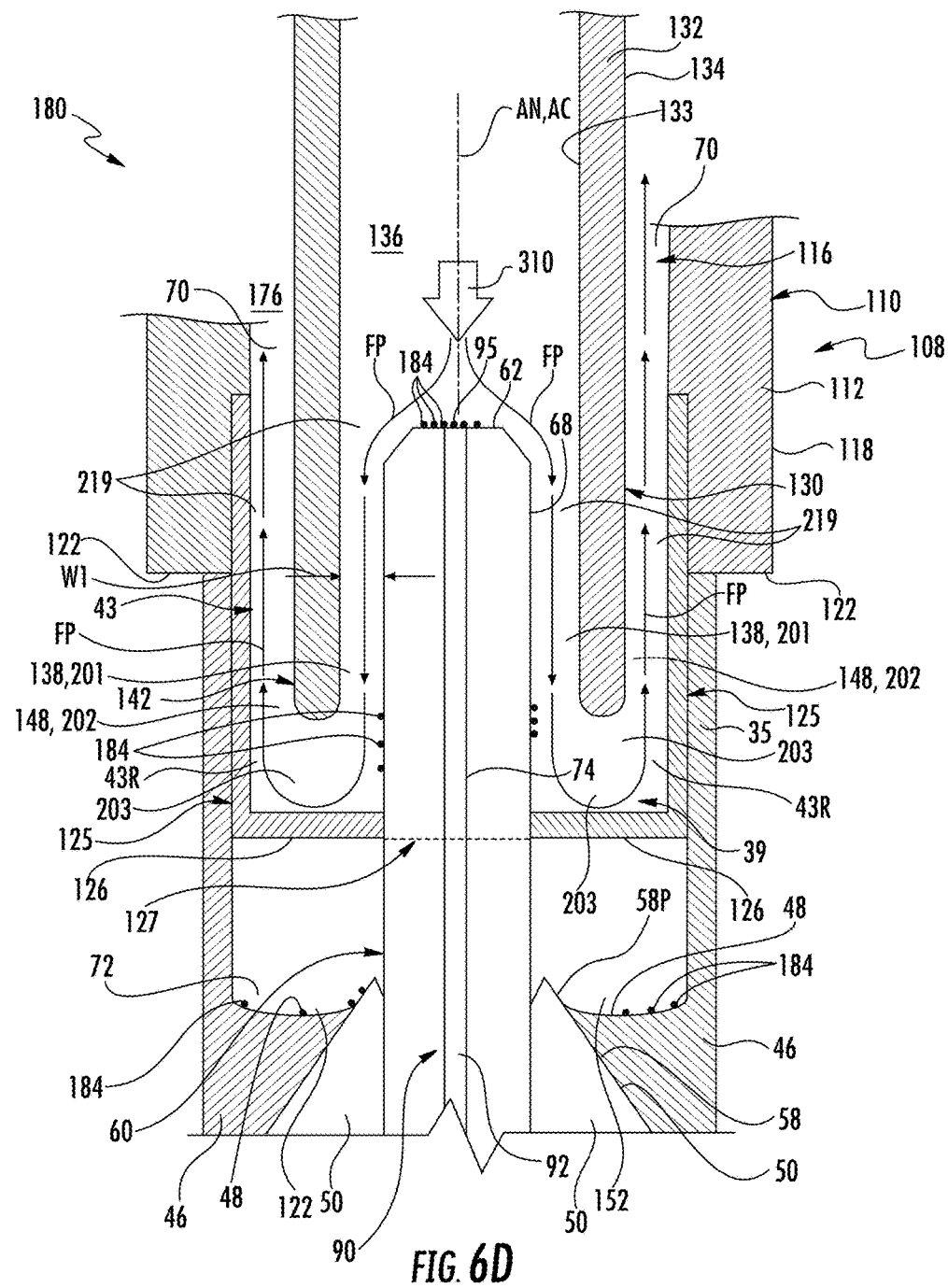

FIG. 5 is a perspective view of nozzle 100 operably engaged with connector 20 of FIG. 2 to form a nozzle assembly 180. FIG. 6A is a close-up cross-sectional view of the nozzle assembly 180 of FIG. 5. FIG. 6B is an even closer cross-sectional view of front end 102 of nozzle 100 and front end 22 of connector 20 of nozzle assembly 180. FIG. 6C and FIG. 6D are further close-up cross-sectional views similar to FIG. 6B and that illustrate different examples of nozzle 100.

When nozzle 100 and connector 20 are operably disposed to form nozzle assembly 180, the tubular wall 132 of inner housing member 130 resides within the tubular gap 70 between ferrule 60 and connector housing 30. Meantime, front-end section 63 of ferrule 60 resides within inner channel 136 in front-end section 142 of inner housing member 130, with a gap 138 between inner surface 133 of tubular wall 132 and the outer surface 68 of ferrule 60.

The front end 122 of outer housing member 110 contacts or is disposed adjacent and in close proximity to front end 32 of connector housing 30 in the embodiment shown. Having front end 122 of outer housing member 110 contact front end 32 of connector housing 30 serves to limit the distance to which front-end section 142 of inner housing member 130 extends into tubular gap 70 of connector housing 30, with this distance denoted as D1 in FIG. 4. The front end 152 of front-end section 142 of inner housing member 130 does not reach interior surface 48 of interior wall 46 and thus resides within well 72.

In an example, a sealing member 123 (e.g., a gasket, sealing material, O-ring, etc.) is disposed between front end 122 of outer housing member 110 and front end 32 of connector housing 30 to form a seal, although a seal may be formed without the use of sealing member 123 in alternative embodiments (e.g., simply by way of contact between outer housing member 110 and connector housing 30). Alternatively, in some embodiments, there may be contact between outer housing member 110 and connector housing 30 without forming a seal (e.g., there may be minimal contact, such as at three circumferential locations). Even further, in some embodiments, front end 122 of outer housing member 110 may be disposed adjacent front end 32 of connector housing 30 so that there is no contact (i.e., front end 122 of outer housing member 110 may be spaced apart from the front end 32 of connector housing 30).

The gap 138 between outer surface 68 of ferrule 60 and inner surface 133 of tubular wall 132 of inner housing member 130 defines a first or "inner" annular conduit section 201 ("inner conduit") that is in fluid communication with the portion of inner channel 136 that is unoccupied by ferrule 60. Likewise, a gap 148 between housing interior surface 38 of sidewalls 36 and outer surface 134 of tubular wall 132 of inner housing member 130 defines a second or "outer" annular conduit section 202 ("outer conduit") that is in fluid communication with outer channel 176 at front-end 122 of outer housing member 110.

The front-end 152 of inner housing member 130 and well 72 (e.g., the interior surface 48 of interior wall 46, and outer surface portion 58P of ferrule holder 50 at rear section 43R of housing interior 43) define a third annular conduit section 203 that fluidly connects the first and second annular conduit sections 201, 202 by wrapping around the front end 152 of the inner housing member. In the embodiment shown, the third conduit section 203 has a U-shaped cross-section and fluidly connects the first and second annular conduit sections 201, 202 at well 72. The third conduit section 203 is thus referred to hereinafter as the "well conduit" 203. The well conduit 203 has an axial dimension or width (the "well gap width") W3, i.e., the distance as measured in the direction of central axes AN and AC between front end 152 of inner housing member 130 and interior surface 48 of interior wall 46.

As can be appreciated, the inner, outer, and well conduits 201, 202, and 203 are all in fluid communication with each other and collectively define a cleaning conduit 210 that in an example encloses at least a portion of front-end section 63 of ferrule 60 and that is also exposed to the interior surface 38 at sidewalls 35 and at well 72.

FIG. 6D is similar to FIG. 6C and illustrates an embodiment wherein the outer housing member 110 includes a flange 125 that extends from front end 122 of outer housing member 110 and that includes an end wall 126 having a central aperture 127 with a diameter slightly larger than diameter of ferrule 60. The flange 125 extends part way into outer housing interior 116 so that flange end wall 126 closes off rear section 43R of housing interior 43. This cuts off well 72 so that only a front portion of housing interior 43 and a corresponding front portion of ferrule outer surface 68 that resides within the housing interior is exposed to flow path FP of cleaning fluid 310.

Inner and Outer Conduits

Figure 7A:
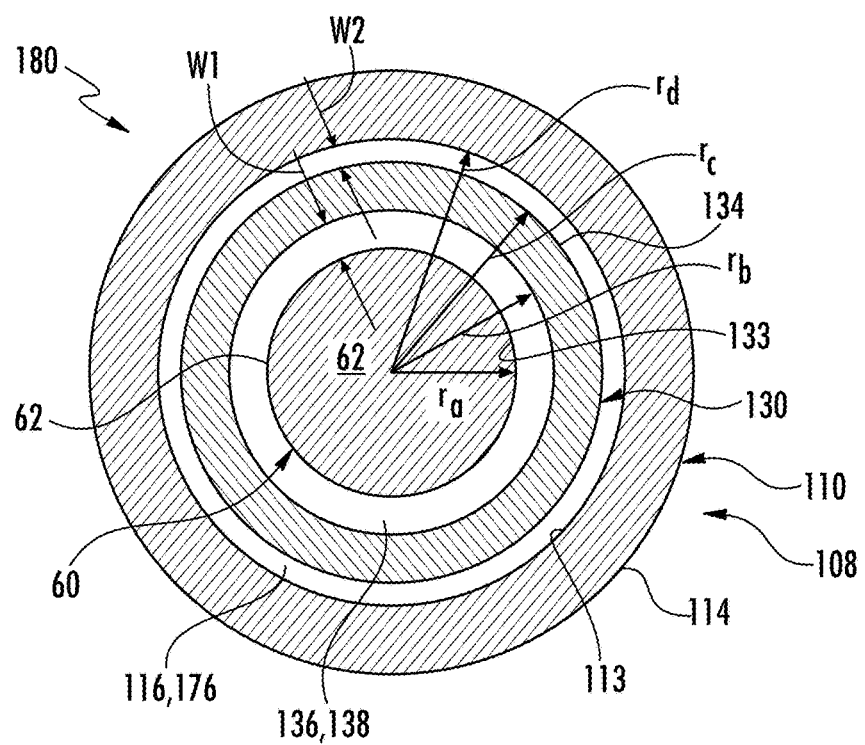
FIGS. 7A and 7B are two cross-sectional views taken along the line B-B in FIG. 6B and show two example configurations of inner and outer annular conduit sections of the nozzle assembly.
Figure 7B:
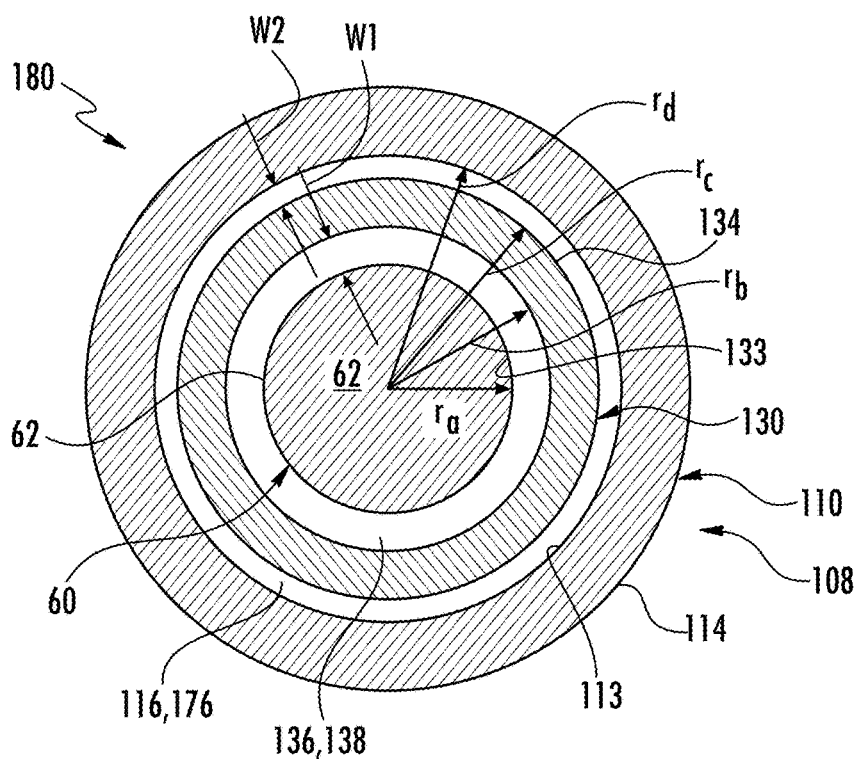

FIGS. 7A and 7B are two cross-sectional views taken along the line B-B in FIG. 6B and show the inner and outer conduits 201 and 202 of nozzle assembly 180. Also shown in FIGS. 7A and 7B are inner and outer radial dimensions $r_a$ and $r_b$ for inner conduit 201, and inner and outer radial dimensions $r_c$ and $r_d$ for outer conduit 202. The inner and outer conduits 201 and 202 are separated by tubular wall 132 of inner housing member 130, wherein the tubular wall has a thickness $TH=r_c-r_b$.

The inner conduit 201 has an annular width ("inner conduit width") $W1=r_b-r_a$, and the outer conduit 202 has an annular width ("outer conduit width") $W2=r_d-r_c$. Thus, the cross-sectional area A1 of the inner conduit 201 is given by $A1=\pi(r_b^2-r_a^2)$, and the cross-sectional area of the outer conduit A2 is given by $A2=\pi(r_d^2-r_c^2)$. In an example, the radii $r_a$, $r_b$, $r_c$, and $r_d$ are selected such that A1=A2, i.e., so that the inner and outer conduits 201 and 202 have the same cross-sectional area and thus the same air flow speed. In another example, the annular widths R1 and R2 are the same, but since $r_c>r_a$ and $r_d>r_b$, it follows that A2>A1, so that the air flow speed through inner conduit 201 is greater than that of through outer conduit 202.

In an example, W3<3·W2, i.e., the well gap width W3 is less than three times the outer conduit width W2.

Method of Cleaning the Connector

The method of cleaning connector 20 includes operably engaging nozzle 100 and connector 20 as described above to form nozzle assembly 180 as part of cleaning apparatus 10. Once this step is complete, then with reference again to FIG. 1 and FIG. 6C, the next step of the method involves activating delivery system 300 to deliver a stream of cleaning fluid 310 into inner channel 136 of inner housing member 130 of nozzle 100. As noted above, cleaning fluid 310 can consist of air or a gas only (i.e., an air or gas jet), can consist of a solvent only (i.e., a solvent stream), or can comprise a combination of gas and a solvent (e.g., an air jet mixed with a solvent).

The cleaning fluid 310 travels from delivery system 300, through nozzle assembly 180, and back to the delivery system. In other words, cleaning fluid 310 flows from delivery system 300, through nozzle 100 to connector 20, back to the nozzle, and then back to the delivery system over a flow path FP. The flow path FP includes ferrule front end 62, outer surface 68 of ferrule 60 at front-end section 63 (or a portion thereof), and at least a portion of interior surface 38 of housing interior 43. The flow path FP can also include rear section 43R of housing interior 43, and in particular can include well 72. More generally, flow path FP is defined at least in part by inner and outer conduits 201 and 202, and well conduit 203.

In an example, cleaning fluid 310 flows from deliver system 300 and into inner channel 136, where it then flows towards ferrule front end 62. The cleaning fluid 310 is incident upon and flows over ferrule front end 62, including chamfer 76. The cleaning fluid 310 then enters and flows through cleaning conduit 210, and then to outer channel 176 of nozzle 100, and then back to delivery system 300. The used cleaning fluid 310 that passes though cleaning conduit 210 over flow path FP can then be stored or disposed of.

More specifically, when the cleaning fluid flows over ferrule front end 62 including chamfer 76, it removes contaminants 184 from these portions of ferrule 60, as well as from end face 95 of optical fiber 90 supported by the ferrule. The cleaning fluid 310 then continues to flow through inner conduit 201. As the cleaning fluid flows over ferrule outer surface 68 at front-end section 63, it removes contaminants 184 from this portion of ferrule 60, as well contaminants that may reside on interior surface 38 of housing 30. The cleaning fluid 310 then flows into well conduit 203 and removes contaminants 184 that may be residing in well 72. This particular portion of flow path FP of the cleaning fluid is important because contaminants 184 tend to collect in well 72 and such contaminants can later find their way to the optical fiber end face 95 after this end face has been cleaned.

The cleaning fluid 310 leaves well conduit 203 and travels through the outer conduit 202, through outer channel 176 of nozzle 100, and then back to delivery system 300.

In the embodiment shown, nozzle 100 is arranged with central axis AN aligned with central axis AC of connector 20. Gap 138 is generally uniform in thickness, as is gap 148. In alternative embodiments, central axis AN of nozzle 100 may be offset from central axis AC of connector 20 such that the gaps 138 and 148 do not have uniform thicknesses. And in such embodiments, when delivering cleaning fluid 310, relative motion may be generated between nozzle 100 and connector 20 (e.g., nozzle 100 may be rotated about central axis AN and/or connector 20 may be rotated about central axis AC) to dynamically change the asymmetry of the gaps.

Fluid Flow Computer Simulations

Fluid flow computer simulations were performed for example configurations of nozzle 100 where A1=A2 (Example 1 nozzle or "EX1") and A1<A2 (Example 2 nozzle or "EX"). The input pressure of the cleaning fluid 310 was set to 10 kPa. The flow of the cleaning fluid 310 was found to be turbulent in both the Example 1 and Example 2 nozzles.

While both example nozzles 100 were observed to be satisfactory for cleaning connector 20, the Example 2 nozzle was found to have some advantages over the Example 1 nozzle. In particular, the Example 2 nozzle exhibited: (1) faster downward airspeed in the inner annulus; (2) pinching of the flow with a rounded tip at front end 152 that produced a higher flow velocity in well 72 and a higher flow velocity in outer conduit 202 along interior surface 38 of walls 35; (3) slightly smaller recirculation zones; and (4) a more unstable pattern for the flow within outer conduit 202.

Additional computer simulations of the flow of cleaning fluid 310 were performed using a commercially available computer program called ANSYS Fluent from Ansys, Inc., Canonsburg, Pa., that performs discrete phase model (DPM) analysis. The computer simulations were directed to assessing cleaning ability by "releasing" contaminants in the form of particles from 2 to 20 microns in diameter, from select surfaces along the flow path FP to simulate particle contamination along these surfaces. The select surfaces were ferrule chamfer 76, ferrule outer surface 68, interior surface 38 of sidewalls 35, and interior surface 48 of interior wall 46.

Figure 8A:
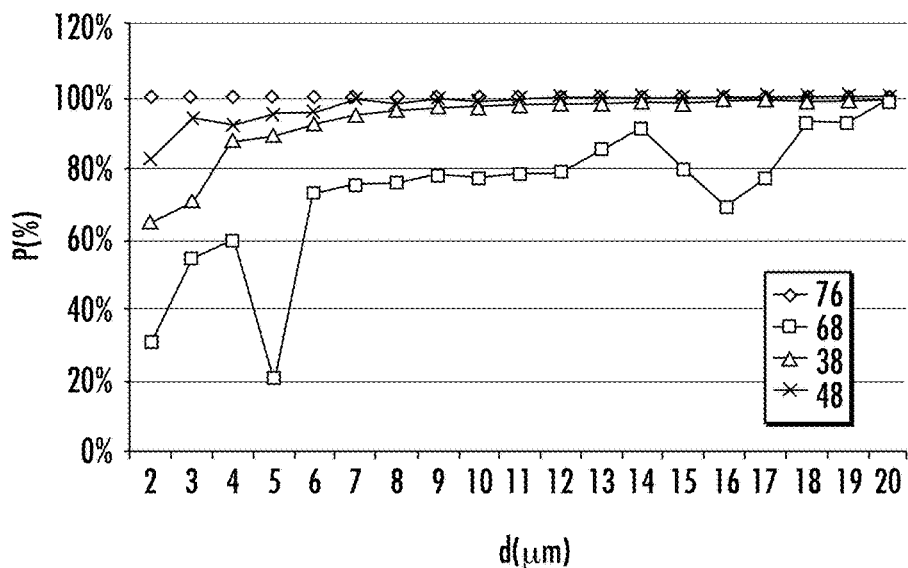
FIGS. 8A and 8B are plots of the percentage P of the particles cleaned out of the optical fiber connector as a function of the particle diameter d (μm) based on described computer simulations for a first example nozzle (FIG. 8A) and a second example nozzle (FIG. 8B), with the legend indicating the reference number of the surface on which the particles reside within the nozzle assembly.
Figure 8B:
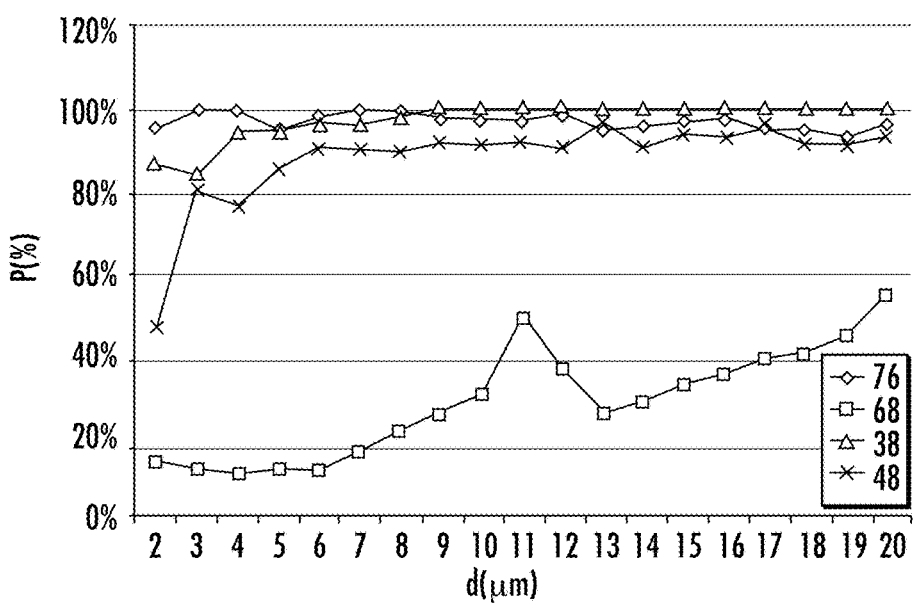

FIGS. 8A and 8B are plots of the percentage P of the particles cleaned out of connector 20 as a function of the particle diameter d (μm) based on the above-described computer simulation for the EX1 (FIG. 8A) and the EX2 nozzle (FIG. 8B). The different curves in the plot of FIGS. 8A and 8B correspond to the different surfaces from which the particles originated.

The plots of FIGS. 8A and 8B show that the EX2 nozzle has better cleaning across the entire particle size range and all releasing surfaces. This is due to the flow pattern differences described above. The most notable improvement is for the case of contamination of the "ferrule side" because of the faster downward airspeed in the inner annulus of the EX2 nozzle. The second most notable improvement is for the case of contamination of the base "wall bottom" because of the higher speed along the base that results from the pinching of the flow with the rounded tip end of the EX2 nozzle.

Figure 9A:
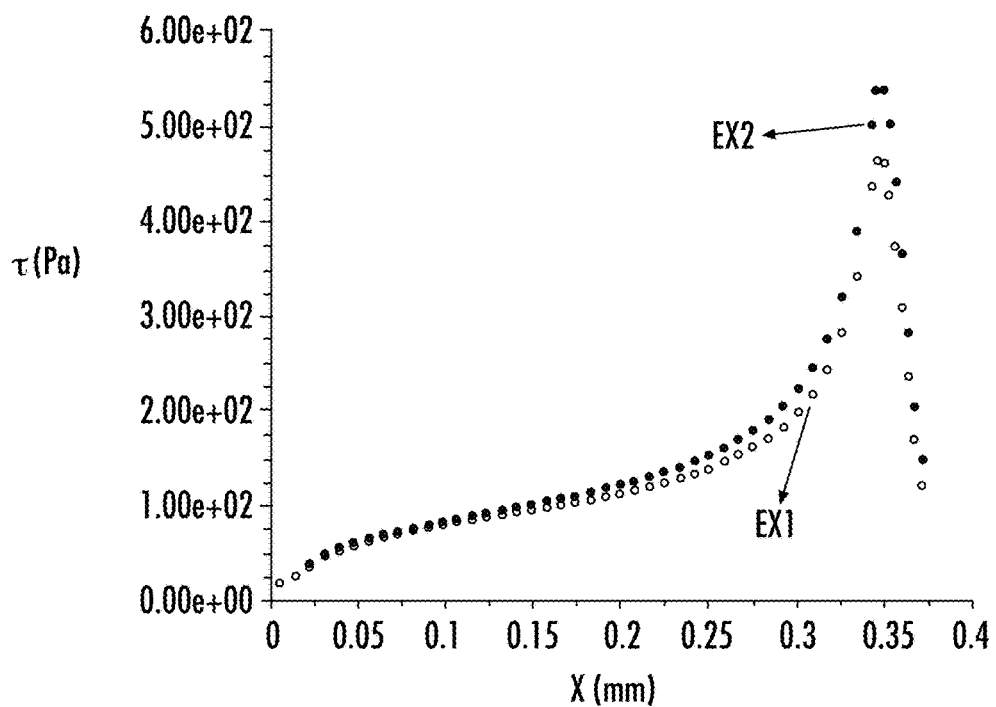
FIGS. 9A through 9D are plots of the shear stress T (Pa) versus the x-position (mm) for the four particle-contributing locations within the optical fiber connector, namely a ferrule chamfer (FIG. 9A), a ferrule outer surface (FIG. 9B), an interior surface of sidewalls of a connector housing (FIG. 9C), and a well (FIG. 9D), with each plot showing the results for the two example nozzles (EX1, EX2) as described below.
Figure 9B:
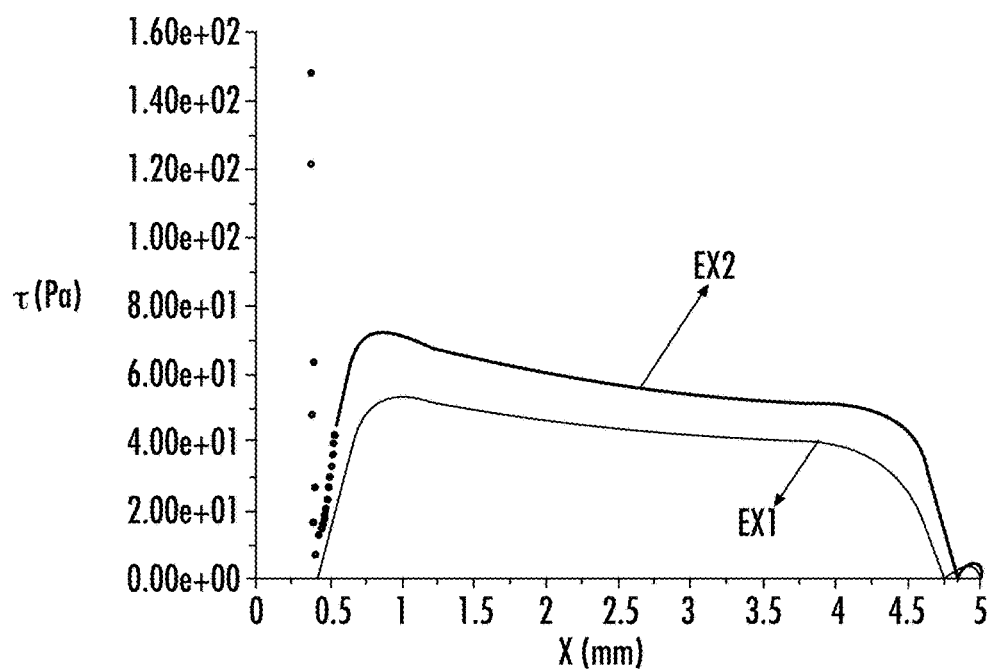
Figure 9C:
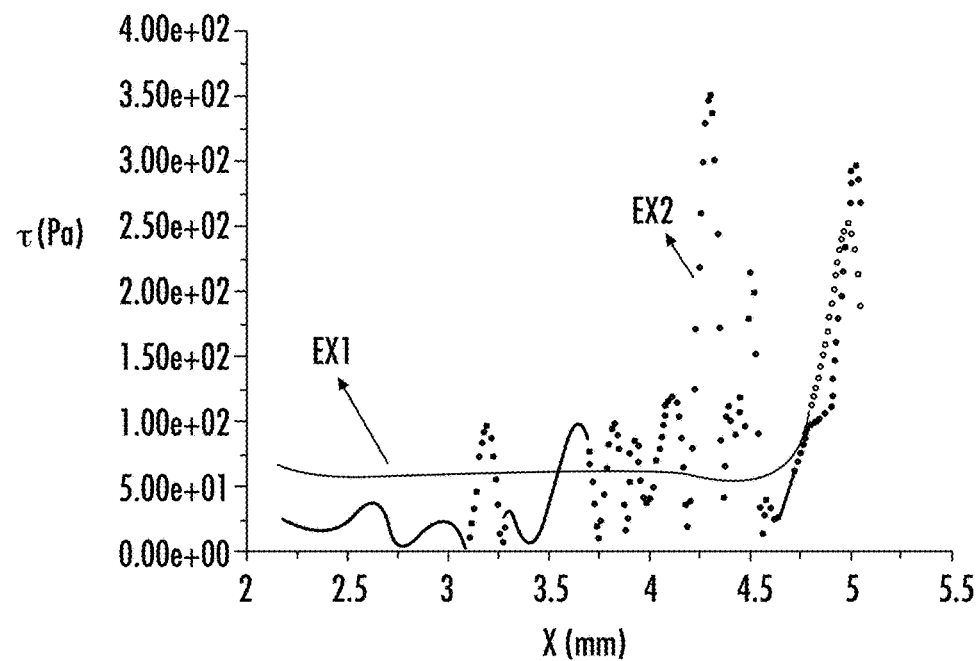
Figure 9D:
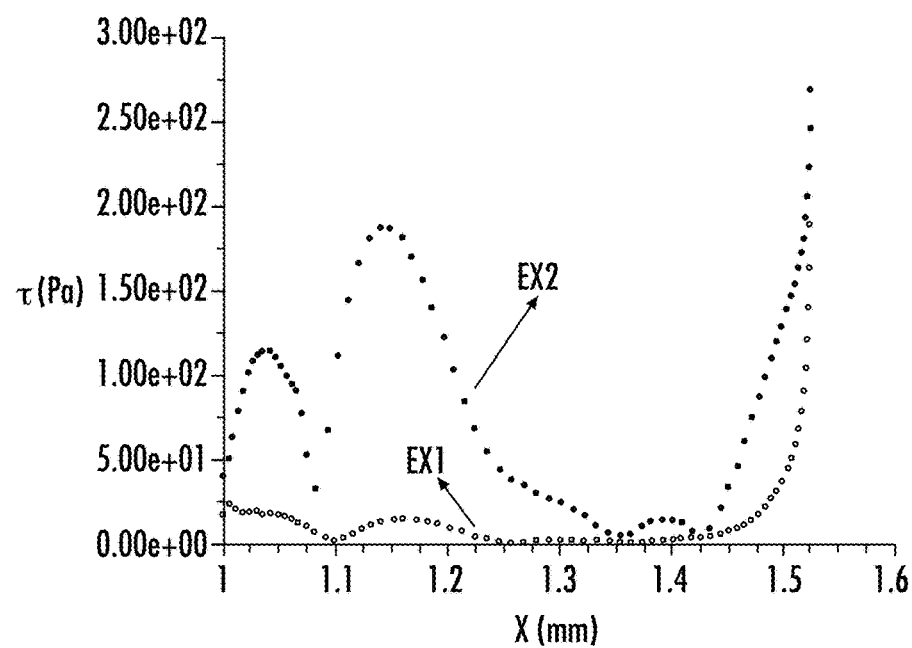

FIGS. 9A through 9D are plots of the shear stress T (Pa) versus the x-position (mm) for the four particle-contributing locations, namely ferrule chamfer 76 (FIG. 9A), ferrule outer surface 68 (FIG. 9B), interior surface 38 at sidewalls 35 (FIG. 9C), and well 72 (FIG. 9D). Each plot includes the results for the EX1 and EX2 nozzles. The larger shear stresses associated with the EX2 nozzle are a function of the different cross-sectional sizes of inner and outer conduits 201 and 202. The shear stress represents a force that dislodges particles through an effective brushing or scrubbing action of cleaning fluid 310 as it passes over the given location.

It will be apparent to those skilled in the art that various modifications to the preferred embodiments described herein can be made without departing from the spirit or scope of the disclosure. For example, although certain elements may have been described above as being annular, in alternative embodiments the elements may have a different tubular shape. This applies, for example, to annular outer channel 176, inner conduit 201, and outer conduit 203. Additionally, although outer conduit 202 includes a portion of housing interior surface 38 in the example embodiment described above, in other embodiments outer housing member 110 may extend into housing interior 43. The outer conduit 202 in such embodiments may be defined between outer surface 134 of inner housing member 130 and an inner surface of outer housing member 110 (i.e., the outer conduit need not include the housing interior surface 38).

Thus, the disclosure covers the modifications and variations provided they come within the scope of the appended claims and the equivalents thereto.

What is claimed is:

1. A nozzle assembly comprising:
 an optical fiber connector comprising: a connector housing having a connector housing front end and an interior surface defining an interior of the connector housing; and a ferrule supported within the interior of the connector housing and having an outer surface and a front-end section, wherein the front-end section of the ferrule extends beyond the connector housing front end;
 a nozzle at least partially inserted into the optical fiber connector, the nozzle having inner and outer housing members, the inner housing member having an inner channel and being at least partially disposed within the outer housing member to define an outer channel between the inner and outer housing members, the inner housing member also having an outer surface; and
 wherein the front-end section of the ferrule resides within the inner channel and the front end of the inner housing member resides within the interior of the connector housing to define a cleaning conduit that includes:
 i) a first conduit section between the outer surface of the ferrule and the inner surface of the inner housing member;
 ii) a second conduit section that includes at least a portion of the outer surface of the inner housing member; and
 iii) a third conduit section that fluidly connects the first and second conduit sections.

2. The nozzle assembly according to claim 1, wherein the outer housing member of the nozzle contacts the connector housing.

3. The nozzle assembly according to claim 2, wherein said contact occurs at least between a front end of the outer housing member and the connector housing front end.

4. The nozzle assembly according to claim 1, wherein a seal is formed between a front end of the outer housing member of the nozzle and the connector housing front end.

5. The nozzle assembly according to claim 1, wherein the second conduit section of the cleaning conduit includes at least a portion of the interior surface of the connector housing.

6. The nozzle assembly according to claim 1, further comprising an optical fiber having an end face, the optical fiber being operably supported by the ferrule such that the optical fiber end face resides substantially at a front end of the ferrule.

7. The nozzle assembly according to claim 1, wherein the second conduit section has a width W2, the third conduit section has a width W3, and wherein W3<3·W2.

8. A cleaning apparatus, comprising:
 a nozzle assembly comprising:
 an optical fiber connector comprising: a connector housing having a connector housing front end and an interior surface defining an interior of the connector housing; and a ferrule supported within the interior of the connector housing and having an outer surface and a front-end section, wherein the front-end section of the ferrule extends beyond the connector housing front end; and a nozzle at least partially inserted into the optical fiber connector, the nozzle having inner and outer housing members, the inner housing member having an inner channel and being at least partially disposed within the outer housing member to define an outer channel between the inner and outer housing members, the inner housing member also having an outer surface;

wherein the front-end section of the ferrule resides within the inner channel and the front end of the inner housing member resides within the interior of the connector housing to define a cleaning conduit that includes:
  i) a first conduit section between the outer surface of the ferrule and the inner surface of the inner housing member;
  ii) a second conduit section that includes at least a portion of the outer surface of the inner housing member; and
  iii) a third conduit section that fluidly connects the first and second conduit sections;

a cleaning fluid delivery system in fluid communication with the nozzle; and an attachment fixture located at a back end of the nozzle, wherein the attachment fixture attaches the nozzle to the cleaning fluid delivery system.

9. A nozzle assembly comprising:

an optical fiber connector comprising: a connector housing a connector housing front end and an interior surface defining an interior of the connector housing; and a ferrule supported within the interior of the connector housing and having an outer surface and a front-end section, wherein the front-end section of the ferrule extends beyond the connector housing front end;

a nozzle operably engaged with the optical fiber connector, the nozzle having inner and outer housing members, the outer housing member having a central axis and a front end that resides adjacent the front end of the connector housing, and the inner housing member being disposed along the central axis to define inner and outer channels; and wherein the front-end section of the ferrule resides within the inner channel to define within the inner and outer channels respective inner and outer conduits that are in fluid communication over a flow path that includes at least a portion of the interior surface of the connector housing.

10. The nozzle assembly according to claim 9, wherein the inner and outer conduits have respective cross-sectional areas A1 and A2, wherein A1<A2.

11. The nozzle assembly according to claim 9, wherein the inner and outer conduits have respective cross-sectional areas A1 and A2, wherein A1=A2.

12. The nozzle assembly according to claim 9, wherein the optical fiber connector operably supports at least one optical fiber that has an end face, wherein the end face resides substantially at a front end of the ferrule, and wherein the flow path includes the front end of the ferrule and the end face of the at least one optical fiber.

13. The nozzle assembly according to claim 9, wherein the front end of the outer housing member and the front end of the connector housing are in contact.

14. The nozzle assembly according to claim 13, wherein the contact between the front end of the housing member and the front end of the connector housing forms a seal between the outer housing member and the connector housing.

15. A nozzle for cleaning an optical fiber connector with a cleaning fluid, wherein the optical fiber connector includes a connector housing and a ferrule, the connector housing having a connector housing front end and an interior defined by an interior surface, the ferrule being supported within the interior and having an outer surface and a front-end section, wherein the front-end section of the ferrule extends beyond the connector housing front end, the nozzle comprising:

inner and outer housing members that respectively define an inner channel and an outer channel, wherein the inner channel is sized to accommodate the front-end section of the ferrule; and wherein the inner and outer channels are configured to be in fluid communication through at least a portion of the interior of the connector housing when the front-end section of the ferrule resides within the inner channel.

16. The nozzle assembly according to claim 15, wherein the fluid communication through at least portion of the interior of the connector housing includes a well conduit section at a rear portion of the interior of the connector housing.

17. A method of cleaning an optical fiber connector having a connector housing and a ferrule supported within the connector housing, wherein the connector housing includes a connector housing front end and an interior surface that defines an interior, and wherein a front-end section of the ferrule extends beyond the connector housing front end, the method comprising:

disposing the front-end section of the ferrule in an inner channel of a nozzle to define a flow path for a cleaning fluid, wherein the front-end section of the ferrule includes a ferrule front end and a ferrule outer surface, and further wherein the flow path includes the ferrule front end, the ferrule outer surface of the front-end section, and at least a portion of the interior surface of the connector housing; and flowing the cleaning fluid over the flow path.

18. The method according to claim 17, wherein the flow path includes a rear portion of the interior of the connector housing.

19. The method according to claim 17, wherein flowing the cleaning fluid further comprises delivering the cleaning fluid from a deliver system fluidly connected to the nozzle.

20. The method according to claim 17, wherein the cleaning fluid consists of air and a solvent.

21. A method of removing contaminants from an optical fiber connector having a connector housing and a ferrule, wherein the connector housing includes a connector housing front end and an interior surface that defines an interior, and wherein the ferrule includes a back-end section supported within the connector housing and a front-end section extending beyond the connector housing front end, the front-end section of the ferrule defining a ferrule end face and including a ferrule outer surface, the method comprising:

a) inserting a front-end section of a nozzle into the interior of the optical fiber connector, the nozzle having inner and outer housing members that define inner and outer channels; and b) flowing a cleaning fluid through the inner channel, through at least a portion of the housing interior and through the outer channel to remove contaminants from the ferrule end face and from at least a portion of the ferrule outer surface and from at least a portion of the connector housing interior.

22. The method according to claim 21, wherein the connector housing interior includes a rear portion of the interior of the connector housing where contaminants collect, and wherein the act b) of flowing the cleaning fluid includes flowing the cleaning fluid through the rear portion of the connector housing interior.

23. The method according to claim 21, wherein the ferrule supports an optical fiber having an end face that resides substantially at the ferrule end face, and wherein act b) of flowing the cleaning fluid includes flowing the cleaning fluid over the optical fiber end face.

\* \* \* \* \*